United States Patent
Sun et al.

(10) Patent No.: US 10,513,625 B2
(45) Date of Patent: Dec. 24, 2019

(54) CROSS-LINKABLE POLYMERIC COMPOSITIONS, METHODS FOR MAKING THE SAME, AND ARTICLES MADE THEREFROM

(71) Applicants: Dow Global Technologies LLC, Midland, MI (US); Yabin Sun, Shanghai (CN); Timothy J. Person, Pottstown, PA (US); Jeffrey M. Cogen, Flemington, NJ (US); Neil W. Dunchus, Collegeville, PA (US); Hao Ming Tu, Shanghai (CN)

(72) Inventors: Yabin Sun, Shanghai (CN); Timothy J. Person, Pottstown, PA (US); Jeffrey M. Cogen, Flemington, NJ (US); Neil W. Dunchus, Collegeville, PA (US); Hao Ming Tu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 293 days.

(21) Appl. No.: 14/441,018

(22) PCT Filed: Dec. 29, 2012

(86) PCT No.: PCT/CN2012/087942
§ 371 (c)(1),
(2) Date: May 6, 2015

(87) PCT Pub. No.: WO2014/101151
PCT Pub. Date: Jul. 3, 2014

(65) Prior Publication Data
US 2015/0299494 A1 Oct. 22, 2015

(51) Int. Cl.
| C09D 123/06 | (2006.01) |
| C08K 5/14 | (2006.01) |
| C08K 5/134 | (2006.01) |
| C08K 5/36 | (2006.01) |
| H01B 13/00 | (2006.01) |

(52) U.S. Cl.
CPC ............ *C09D 123/06* (2013.01); *C08K 5/134* (2013.01); *C08K 5/14* (2013.01); *C08K 5/36* (2013.01); *H01B 13/0016* (2013.01)

(58) Field of Classification Search
None
See application file for complete search history.

(56) References Cited

U.S. PATENT DOCUMENTS

| 2005/0215737 A1* | 9/2005 | Dharmarajan | C08F 210/16 526/170 |
| 2007/0249743 A1* | 10/2007 | Sehanobish | B29C 44/12 521/134 |
| 2010/0036031 A1* | 2/2010 | Herbst | C08K 5/00 524/331 |
| 2011/0155416 A1 | 6/2011 | Easter | |
| 2012/0108758 A1* | 5/2012 | Laignel | C08J 3/2053 525/330.3 |
| 2015/0299494 A1 | 10/2015 | Sun et al. | |

FOREIGN PATENT DOCUMENTS

| EP | 0318841 A2 | 6/1989 |
| WO | WO 2010/146300 | * 12/2010 |
| WO | 2014/101151 A1 | 7/2014 |

OTHER PUBLICATIONS

Gustafsson et al. ("Stabilization of peroxide crosslinked polyethylene") (see IDS).*
Gustaffsson, B. et al. Stabilization of perocide crosslinked polyethylene. Die Angewandte Makromolekulare Chemie. Dec. 1998, V 261/262, pp. 93-99, figures 1 and 4, table 1.
PCT/ CN2012/087942, International Search Report & Written Opinion—dated Jul. 9, 2015.
PCT/CN2012/087942, International Preliminary Report on Patentability—dated Oct. 17, 2013.
Sax, N. Irving, et al., "Absorption", Hawley's Condensed Chemical Dictionary, 1987.

* cited by examiner

Primary Examiner — Austin Murata (57) ABSTRACT

Cross-linkable polymeric compositions comprising an ethylene-based polymer, an organic peroxide, an optional cross-linking coagent, and an antioxidant. Such cross-linkable polymeric compositions are prepared by imbibing at least a portion of the organic peroxide, the optional cross-linking coagent, and the antioxidant into the ethylene-based polymer. Such cross-linkable polymeric compositions can be employed in forming coated conductors.

10 Claims, 5 Drawing Sheets

CROSS-LINKABLE POLYMERIC COMPOSITIONS, METHODS FOR MAKING THE SAME, AND ARTICLES MADE THEREFROM

FIELD

Various embodiments of the present invention relate to cross-linkable polymeric compositions and methods of making the same. Other aspects of the invention concern cross-linked ethylene-based polymer compositions and articles made therefrom.

INTRODUCTION

Medium, high, and extra-high voltage ("MV," "HV," and "EHV") cables typically contain a peroxide-cross-linked ethylene-based polymer material as an insulation layer. Although cross-linking provides valuable improvement in thermomechanical properties of the material, the peroxide used for cross-linking creates byproducts that require removal from the material after it is formed into an insulation layer (e.g., by degassing) but before a jacketing layer is placed over the insulation layer. In the case of dicumyl peroxide, these byproducts include methane, acetophenone, alpha methylstyrene, and cumyl alcohol. To reduce the amount of byproducts, the use of cross-linking coagents has been investigated, which can be used to lower the amount of peroxide employed for cross-linking Although advances have been achieved in this field, improvements are still desired.

SUMMARY

One embodiment is a process for preparing a cross-linkable polymeric composition, said process comprising:
combining an ethylene-based polymer with an organic peroxide and an antioxidant to thereby form said cross-linkable polymeric composition,
wherein said combining step comprises imbibing at least a portion of said organic peroxide and at least a portion of said antioxidant into said ethylene-based polymer.

Another embodiment is a process for producing a coated conductor, said process comprising:
(a) premixing an organic peroxide and an antioxidant to thereby form an initial mixture;
(b) at least partially immersing or coating an ethylene-based polymer in said initial mixture and allowing said ethylene-based polymer to at least partially imbibe said initial mixture to thereby form a cross-linkable polymeric composition comprising said ethylene-based polymer, at least a portion of said organic peroxide, and at least a portion of said antioxidant;
(c) coating a conductor with at last a portion of said cross-linkable polymeric composition; and
(d) curing or allowing to cure at least a portion of said cross-linkable polymeric composition on said conductor, thereby forming said coated conductor.

BRIEF DESCRIPTION OF THE DRAWINGS

Reference is made to the accompanying drawings in which.

DETAILED DESCRIPTION

Various embodiments of the present invention concern methods for preparing cross-linkable polymeric compositions comprising an ethylene-based polymer, an organic peroxide, and an antioxidant. Additional embodiments concern cross-linked polymeric compositions prepared from such cross-linkable polymeric compositions. Further embodiments concern processes for producing a coated conductor using the cross-linkable polymeric compositions.

Cross-Linkable Polymeric Composition

As noted above, one component of the cross-linkable polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

In various embodiments, the ethylene-based polymer can be an ethylene homopolymer. As used herein, "homopolymer" denotes a polymer comprising repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene(allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In various embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based polymer can be an LDPE. LDPEs are generally highly branched ethylene homopolymers, and can be prepared via high pressure processes (i.e., HP-LDPE). LDPEs suitable for use herein can have a density ranging from 0.91 to 0.94 g/cm³. In various embodiments, the ethylene-based polymer is a high-pressure LDPE having a density of at least 0.915 g/cm³, but less than 0.94 g/cm³, or less than 0.93 g/cm³. Polymer densities provided herein are determined according to ASTM International ("ASTM") method D792. LDPEs suitable for use herein can have a melt index ($I_2$) of less than 20 g/10 min., or ranging from 0.1 to 10 g/10 min., from 0.5 to 5 g/10min., from 1 to 3 g/10 min., or an $I_2$ of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

In an embodiment, the ethylene-based polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm³. LLDPEs suitable for use herein can have a melt index ($I_2$) ranging from 1 to 20 g/10 min., or from 3 to 8 g/10 min.

In an embodiment, the ethylene-based polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm³. VLDPEs suitable for use herein can have a melt index ($I_2$) ranging from 0.1 to 20 g/10 min., or from 0.3 to 5 g/10 min.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from $10^{-12}:1$ to $10^{-1}:1$, or from $10^{-9}:1$ to $10^{-5}:1$.

An example of a commercially available ethylene-based polymer suitable for use herein is DXM-446 low-density polyethylene, produced by The Dow Chemical Company, Midland, Mich., USA.

As noted above, the above-described ethylene-based polymer is combined with an organic peroxide. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, "hydrocarbyl" denotes a univalent group formed by removing a hydrogen atom from a hydrocarbon (e.g. ethyl, phenyl) optionally having one or more heteroatoms. As used herein, "hydrocarbylene" denotes a divalent group formed by removing two hydrogen atoms from a hydrocarbon optionally having one or more heteroatoms. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$ alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms and structure, or any two of R, $R^1$, and $R^2$ can have the same number of carbon atoms while the third has a different number of carbon atoms and structure.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP"); tert-butyl peroxybenzoate; di-tert-amyl peroxide ("DTAP"); bis(alpha-t-butyl-peroxyisopropyl)benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)-3,3,5-trimethylcyclohexane; isopropylcumyl cumylperoxide; butyl4,4-di(tert-butylperoxy)valerate; di(isopropylcumyl)peroxide; and mixtures of two or more thereof. In various embodiments, only a single type of organic peroxide is employed. In an embodiment, the organic peroxide is dicumyl peroxide.

As noted above, an antioxidant is employed with the cross-linkable polymeric composition. Exemplary antioxidants include hindered phenols (e.g., tetrakis[methylene(3, 5-di-t-butyl-4-hydroxyhydrocinnamate)]methane), less-hindered phenols, and semi-hindered phenols; phosphates, phosphites, and phosphonites (e.g., tris(2,4-di-t-butylphenyl)phosphate); thio compounds (e.g., dilaurylthiodipropionate); various siloxanes; and various amines (e.g., polymerized 2,2,4-trimethyl-1,2-dihydroquinoline). In various embodiments, the antioxidant is selected from the group consisting of distearyl thiodipropionate, dilauryl thiodipropionate, octadecyl-3,5-di-t-butyl-4-hydroxyhydrocinnamate, benzenepropanoic acid, 3,5-bis(1,1-dimethylethyl)-4-hydroxy-thiodi-2,1-ehtanediyl ester, stearyl 3-(3,5-di-t-butyl-4-hydroxyphenyl)propionate, octadecyl-3-(3,5-di-tert-butyl-4-hydroxyphenyl)-propionate, 2,4-bis (dodecylthiomethyl)-6-methylphenol, 4,4'-thiobis(6-tert-butyl-m-cresol), 4,6-bis(octylthiomethyl)-o-cresol, 1,3,5-tris(4-tert-butyl-3-hydroxy-2,6-dimethyl benzyl)-1,3,5-triazine-2,4,6-(1H,3H,5H)-trione, pentaerythritol tetrakis(3-(3,5-di-t-butyl-4-hydroxyphenyl)propionate), 2',3-bis[[3-[3,5-di-tert-butyl-4-hydroxyphenyl]propionyl]]propionohydrazide, and mixtures of two or more thereof.

In various embodiments, the cross-linkable polymeric composition can optionally include a cross-linking coagent. Such cross-linking coagents include polyallyl cross-linking coagents; ethoxylated bisphenol A dimethacrylate; α-methyl styrene dimer ("AMSD"); acrylate-based coagents, such as trimethylolpropane triacrylate ("TMPTA"), trimethylolpropane trimethacrylate ("TMPTMA"), 1,6-hexanediol diacrylate, pentaerythritol tetraacrylate, dipentaerythritol pentaacrylate, tris(2-hydroxyethyl)isocyanurate triacrylate, and propoxylated glyceryl triacrylate; vinyl-based coagents, such as polybutadiene having a high 1,2-vinyl content, and trivinyl cyclohexane ("TVCH"); and other coagents as described in U.S. Pat. Nos. 5,346,961 and 4,018,852.

In an embodiment, the cross-linking coagent, when present, can be a polyallyl cross-linking coagent. As used herein, "polyallyl" denotes a compound having at least two pendant allyl functional groups. In various embodiments, the cross-linking coagent is a triallyl compound. In certain embodiments the cross-linking coagent is selected from the group consisting of triallyl isocyanurate ("TAIC"), triallyl cyanurate ("TAC"), triallyl trimellitate ("TATM"), triallyl orthoformate, pentaerythritol triallyl ether, triallyl citrate, triallyl aconitate and mixtures of two or more thereof. In an embodiment, the cross-linking coagent is TAIC. In various embodiments, the polyallyl cross-linking coagent constitutes all or substantially all of cross-linking coagents present in the cross-linkable polymeric composition, when a cross-linking coagent is employed.

In various embodiments, the cross-linking coagent, when present, and the organic peroxide are present in a weight ratio of at least 1.0, at least 1.2, at least 1.5, or at least 2.0, and up to 10.0, cross-linking coagent/organic peroxide.

In various embodiments, when a polyallyl cross-linking coagent is employed, the polyallyl cross-linking coagent and organic peroxide are present in amounts sufficient to achieve a molar ratio of allyl groups to active oxygen atoms of at least 1.6, at least 1.9, at least 2.5, or at least 3.0, and up to 5, up to 7.5, up to 10, up to 12, or up to 16 allyl groups/active oxygen atoms. In determining this ratio, only oxygen atoms present as one of two covalently bonded oxygen atoms in the organic peroxide are considered "active oxygen atoms." For example, a mono-functional peroxide has two active oxygen atoms. Oxygen atoms present in the organic peroxide or the polyallyl cross-linking coagent that are not covalently bonded to another oxygen atom are not considered active oxygen atoms. Additionally, only pendant allyl groups found on the polyallyl cross-linking coagent are included in the molar ratio of allyl groups/active oxygen atoms. The allyl-to-active oxygen molar ratio is calculated as follows:

$$\frac{(\text{moles polyallyl coagent})(\text{number of allyl groups per coagent molecule})}{(\text{moles peroxide})(\text{number of active oxygen atoms per peroxide molecule})}$$

In various embodiments, the cross-linkable polymeric composition can comprise the ethylene-based polymer in an amount ranging from 50 to 99 wt %, from 80 to 99 wt %, from 90 to 99 wt %, or from 95 to 99 wt %, based on the entire cross-linkable polymeric composition weight. Additionally, the cross-linkable polymeric composition can comprise the organic peroxide in an amount ranging from 0.1 to 5 wt %, from 0.1 to 3 wt %, from 0.4 to 2 wt %, from 0.4 to 1.7 wt %, from 0.5 to 1.4 wt %, or from 0.7 to less than 1.0 wt %, based on the entire cross-linkable polymeric composition weight. Antioxidants can be used in amounts ranging from 0.01 to 5 wt %, from 0.01 to 1 wt %, from 0.1 to 5 wt %, from 0.1 to 1 wt %, or from 0.1 to 0.5 wt %, based on the total weight of the cross-linkable polymeric composition. Furthermore, the cross-linkable polymeric composition can comprise the optional cross-linking coagent in an amount ranging from 0 to 3 wt %, from 0.1 to 3 wt %, from 0.5 to 3 wt %, from 0.7 to 3 wt %, from 1.0 to 3 wt %, or from 1.5 to 3 wt %, based on the entire cross-linkable polymeric composition weight.

The cross-linkable polymeric composition may also contain other additives including, but not limited to, processing aids, fillers, coupling agents, ultraviolet absorbers or stabilizers, antistatic agents, nucleating agents, slip agents, plasticizers, lubricants, viscosity control agents, tackifiers, antiblocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

Preparation of Cross-Linkable Polymeric Composition

Preparation of the cross-linkable polymeric composition comprises combining the above-described ethylene-based polymer with the organic peroxide, the optional cross-linking coagent, and the antioxidant. The process for combining these components includes imbibing at least a portion of the organic peroxide and at least a portion of the antioxidant into the ethylene-based polymer. When employed, the cross-linking coagent, or at least a portion thereof, can also be imbibed into the ethylene-based thermoplastic polymer. As used herein, "imbibing" denotes absorption by the ethylene-based polymer of at least a portion of the organic peroxide, at least a portion of the antioxidant, and, when present, at least a portion of the cross-linking coagent, which is accomplished by physical contact (e.g., by coating) between the ethylene-based polymer and the organic peroxide, the optional cross-linking coagent, and antioxidant. In an embodiment, the organic peroxide, the optional cross-linking coagent, and the antioxidant can be premixed at a temperature from 40 to 90° C. Some antioxidants, despite having a very high melting temperature (e.g., 150° C.), do not need melting in this process since they are dissolved by other components having lower melting points to form a liquid mixture below the melting point of the antioxidant. Thereafter, at least a portion of the ethylene-based polymer can be immersed in or coated with the resulting peroxide/optional coagent/antioxidant mixture for a time and temperature sufficient to effect such imbibing.

In various embodiments, the peroxide/optional coagent/antioxidant mixture, prior to introduction of the ethylene-based polymer, can have an initial heat release temperature of at least 120° C., at least 130° C., at least 140° C., or at least 150° C. Additionally, the peroxide/optional coagent/ antioxidant mixture can have an initial heat release temperature in the range of from 120 to 300° C., from 130 to 250° C., from 140 to 200° C., or from 140 to 160° C. As used herein, the phrase "initial heat release temperature" denotes the temperature at which the peroxide/optional coagent/antioxidant mixture begins to decompose via one or more exothermic reactions. Such initial heat release temperature is measured via differential scanning calorimetry ("DSC"), as described in the Test Methods section, below, and is defined as the point above 80° C. at which the slope of the DSC plot exceeds 0.02 watts per gram degrees Celsius ("W/g.° C."), indicating the initial stage of exothermic reaction. Increasing the initial heat release temperature of the peroxide/optional coagent/antioxidant mixture can be important because, as described below, soaking of the ethylene-based polymer can be performed at temperatures up to 110° C. Having an initial heat release temperature of less than 120° C. can be a safety concern since the operating window is significantly reduced.

When immersion is employed to effect the above-noted imbibing step, pellets of the ethylene-based polymer can be partially immersed in the above-described peroxide/optional coagent/antioxidant mixture. In other embodiments, ethylene-based polymer pellets can be coated with the peroxide/optional coagent/antioxidant mixture to achieve imbibing.

The above-described imbibing can be performed at a temperature ranging from the melting temperature of the peroxide/optional coagent/antioxidant mixture up to the lower of the melting temperature of the polymer or the initial heat release temperature, from 30 to 110° C., from 50 to 108° C., from 80 to 104° C., from 90 to 102° C., or from 95 to 100° C. Additionally, the imbibing can be performed for a period of time ranging from 1 to 168 hours, from 1 to 24 hours, or from 3 to 12 hours.

In an embodiment, the only combining step employed involves the above-described imbibing process. In other words, in various embodiments, no compounding procedure is employed to combine any portion of the organic peroxide, the optional cross-linking coagent, or the antioxidant with the ethylene-based polymer.

The resulting cross-linkable polymeric composition will generally be composed of ethylene-based polymer, antioxidant, peroxide, and the reaction products of any two or three of these components. Though not wishing to be bound by theory, it is thought that the reaction products of these components may contain groups such as sulfur, phenol and its derivatives, and/or peroxyl groups. It is thought that reactions among these components may be radical reactions, and may happen in the presence of oxygen. Additionally, again not wishing to be bound by theory, but the cross-linked polymeric composition may comprise an oxidation product of a thioether-based antioxidant, the concentration of which is enhanced by the pre-treatment process. Any one or more of these reaction products may have the capability to interact with radicals. It is theorized that such reaction products formed during imbibing could act as "storage" for radicals. In such a case, fewer radicals may be released at the processing temperature to help prevent premature cross-linking (i.e., scorch), but more radicals are released at curing temperature to aid in cross-linking (which is discussed below). Alternatively, it is possible that such reaction products formed during imbibing could act as radical scavengers, tending to "catch" radicals released during processing but having lower tendency to catch radicals at the temperature employed for cross-linking.

Cross-linked Polymeric Composition

The above-described cross-linkable polymeric composition can be cured or allowed to cure in order to form a cross-linked ethylene-based polymer. Such curing can be performed by subjecting the cross-linkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the cross-linked polymeric composition can be cooled (e.g., to ambient temperature).

The cross-linking process can create volatile decomposition byproducts in the cross-linked polymeric composition. The term "volatile decomposition products" denotes byproducts formed during the curing step, and possibly during the cooling step, by initiation of the organic peroxide. Such byproducts can comprise alkanes, such as methane. Following cross-linking, the cross-linked polymeric composition can undergo degassing to remove at least a portion of the volatile decomposition byproducts. Degassing can be performed at a degassing temperature, a degassing pressure, and for a degassing time period to produce a degassed polymeric composition. In various embodiments, the degassing temperature can range from 50 to 150° C., or from 60 to 80° C. In an embodiment, the degassing temperature is 65 to 75° C. Degassing can be conducted under standard atmosphere pressure (i.e., 101,325 Pa).

The extent of cross-linking in the cross-linked polymeric composition can be determined via analysis on a moving die rheometer ("MDR") at 180° C. according to ASTM D5289. Upon analysis, an increase in torque, as indicated by the difference between the maximum torque ("MH") and the minimum torque ("ML"), ("MH–ML"), indicates greater degree of cross-linking The resulting cross-linked polymeric composition can have an MH–ML of at least 2.5 dN·m, at least 2.75 dN·m, at least 3 dN·m, at least 3.25 dN·m, at least 3.5 dN·m, or at least 3.75 dN·m, with a practical upper limit of 6 dN·m. In an embodiment, the cross-linked polymeric composition can have an MH–ML ranging from 2.5 to 6 dN·m, from 2.75 to 6 dN·m from 3 to 6 dN·m, from 3.25 to 6 dN·m, from 3.5 to 6 dN·m, or from 3.75 to 6 dN·m.

In various embodiments, the cross-linked polymeric composition can have a scorch improvement ("SI") of at least 10 minutes. Scorch improvement is determined according to the procedures described in the Test Methods section, below.

Coated Conductor

A cable comprising a conductor and an insulation layer can be prepared employing the above-described cross-linkable polymeric composition. "Cable" and "power cable" mean at least one wire or optical fiber within a sheath, e.g., an insulation covering and/or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the cross-linkable polymeric composition onto the conductor, either directly or onto an interceding layer. A description of a conventional extruder can be found in U.S. Pat. No.

4,857,600. An example of co-extrusion and an extruder therefore can be found in U.S. Pat. No. 5,575,965.

Following extrusion, the extruded cable can pass into a heated cure zone downstream of the extrusion die to aid in cross-linking the cross-linkable polymeric composition and thereby produce a cross-linked polymeric composition. The heated cure zone can be maintained at a temperature in the range of 175 to 260° C. In an embodiment, the heated cure zone is a continuous vulcanization ("CV") tube. In various embodiments, the cross-linked polymeric composition can then be cooled and degassed, as discussed above.

Alternating current cables can be prepared according to the present disclosure, which can be low voltage, medium voltage, high voltage, or extra-high voltage cables. Further, direct current cables can be prepared according to the present disclosure, which can include high or extra-high voltage cables.

Test Methods

Sample Preparation (Compounding)

Feed polyethylene ("PE") pellets into a Brabender mixer at 120° C. with a rotor speed of 30 rpm and mix in the antioxidant once the PE melts, followed by addition of the cross-linking coagent (if employed), and finally the organic peroxide. Mixing time after addition of cross-linking coagent and organic peroxide is 5 minutes. The PE employed is DXM-446, a low-density polyethylene produced by the Dow Chemical Company, Midland, Mich., USA, which has a density of 0.92 g/cm$^3$ and a melt index ($I_2$) of 2.35 g/10 min. The remaining components are described below.

Sample Preparation (Imbibing)

Place polyethylene pellets having the prescribed weight (about 50 g) into a container. Combine and dissolve the organic peroxide, the cross-linking coagent (if employed), and the antioxidant in a separate container at a temperature ranging from 40 to 90° C. Inject the amount of the resulting mixture prescribed in the Examples, below, into the container holding the polyethylene pellets via a syringe. The syringe should be heated so as to avoid crystallization of the mixture during injection. Seal the container and shake by hand for about 1 minute to ensure the peroxide/optional coagent/antioxidant mixture is evenly distributed among the polyethylene pellets. Place the container into an oven having the prescribed temperature.

Compression Molding

Using a Lab Tech LP-S-50/ASTM laboratory hydraulic press, preheat the sample covered on opposing sides by two polyethylene terephthalate ("PET") membranes in the mold at 130° C. for 5 minutes. Release air trapped in the sample by opening and closing the plate eight times. Increase the plate temperature to 182° C. over 5 minutes. Cure the sample under a pressure of 100 kN for 15 minutes. Decrease the plate temperature to 45° C. over 5 minutes.

Moving Die Rheometer

Perform moving die rheometer ("MDR") testing at 180° C. and 140° C. respectively according to the methods described in ASTM D5289 on an Alpha Technologies MDR 2000 using samples cut from the sheet prepared by compression molding.

Mechanical (Tensile) Properties

Determine mechanical properties according to ASTM D638 on an Instron model 5565 tensile tester using compression-molded, cured samples.

Differential Scanning Calorimetry/Initial Heat Release Temperature

Differential scanning calorimetry ("DSC") is conducted on a DSC Q2000 manufactured by TA Instruments. Perform DSC by increasing the temperature from room temperature to 150° C. at a rate of 10° C./min. Determine the initial heat release temperature by identifying the first point on the DSC curve greater than 80° C. that has a slope of greater than 0.02 W/g.° C.

Heat Aging

Conduct heat aging at a temperature of 136° C. for 168 hours using compression-molded, cured samples.

Scorch Improvement

Scorch improvement of a sample X is calculated using the following formula:

$$SI = ts1@140° C. - ts1'@140° C.$$

where SI is the scorch improvement, ts1@140° C. is the scorch time of sample X measured by MDR at 140° C., and ts1'@140° C. is the predicted scorch time calculated by the following formula (1) which is the relationship between ts1@140° C. and MH−ML@180° C. of the samples prepared through a conventional compounding process with only DCP as curing agent:

$$ts1'@140° C. = -7.97 + (167.91/(MH-ML@180° C.)) \quad (1)$$

where MH−ML@180° C. is the cross-link density of sample X measured via MDR at 180° C. The SI provides a way to compare the scorch performance given the same crosslink density. Formula (1) is determined based on comparisons of eight samples prepared through conventional compounding process with DCP as curing agent. The samples are prepared as described above in the Sample Preparation section according to the formulas in Table 1, and analyzed via MDR according to the above-provided methods:

TABLE 1

Scorch Improvement Formula (1) Determination Samples

|  | SIS1 | SIS2 | SIS3 | SIS4 | SIS5 | SIS6 | SIS7 | SIS8 |
|---|---|---|---|---|---|---|---|---|
| DFDA 4850 NT (wt %) | 99.3 | 99.2 | 99.1 | 98.8 | 98.6 | 98.4 | 98.3 | 98 |
| DCP (wt %) | 0.70 | 0.80 | 0.925 | 1.2 | 1.4 | 1.6 | 1.7 | 2 |
| Total | 100 | 100 | 100 | 100 | 100 | 100 | 100 | 100 |
| ML @180° C. | 0.17 | 0.18 | 0.17 | 0.18 | 0.19 | 0.19 | 0.19 | 0.19 |
| MH @180° C. | 1.16 | 1.35 | 1.62 | 2.30 | 2.85 | 3.21 | 3.43 | 4.15 |
| MH − ML @180° C. | 0.99 | 1.17 | 1.45 | 2.12 | 2.66 | 3.02 | 3.24 | 3.96 |
| T90 @180° C. | 4.95 | 4.03 | 4.70 | 4.49 | 4.54 | 4.40 | 4.41 | 4.20 |
| ts1 @180° C. | 2.08 | 1.81 | 2.79 | 1.83 | 1.54 | 1.39 | 1.31 | 1.14 |
| ts1 @140° C. | 162 | 136 | 107 | 72 | 53 | 48 | 44 | 37 |

Plotting the data provided in Table 1 using MH−ML @ 180° C. versus tsl @ 140° C. yields formula (1). JMP™ statistical discovery software is employed to fit the data in Table 1 to arrive at formula (1). MH−ML and tsl @ 140° C. are inversely related (at least within the common range of DCP loading). Therefore MH−ML is first transformed to its reciprocal form, 1/(MH−ML), then fit a line between tsl@140° C. and 1/(MH−ML). This yields the equation (formula (1)) between tsl @ 140° C. and MH−ML. The steps employed for generating formula (1) in the JMP™ statistical discovery software are listed below 1. Click Analyze/Fit Y by X;
2. Pick up MH−ML into X, factor and tsl@140° C. into Y, response;
3. Click the top left red triangle, select "fit special";
4. Select Reciprocal: 1/x in X transformation column and click OK button.

Figure 1:
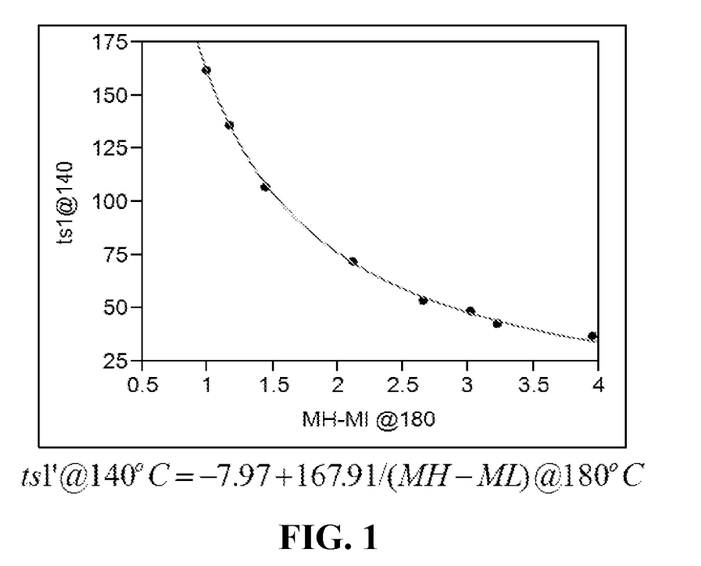
FIG. 1 is a plot of MH–ML @ 180° C. versus ts1' @ 140° C. used to determine the relationship between scorch time and cross-link density for peroxide-crosslinked polyethylene.
Figure 2:
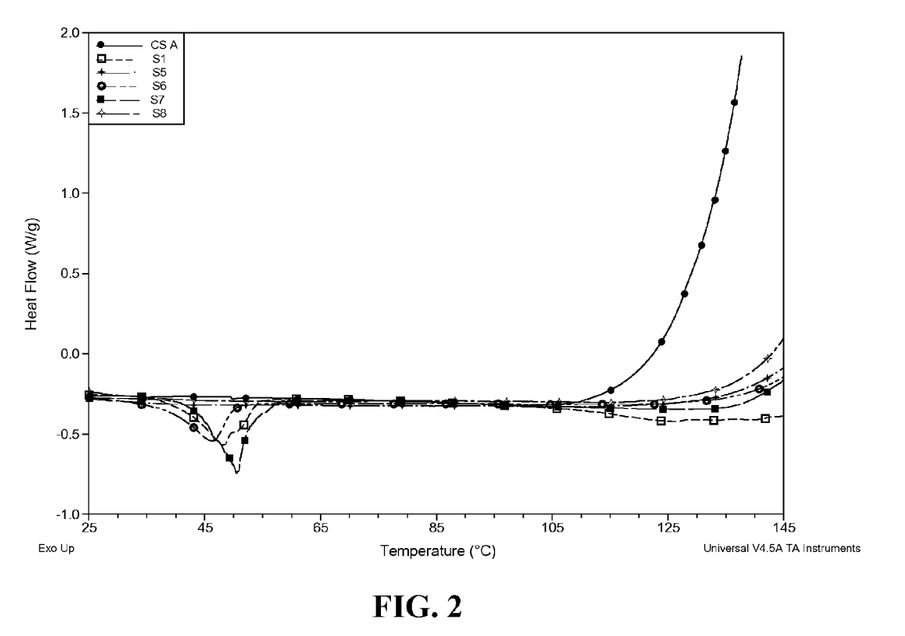
FIG. 2 is a differential scanning calorimetry ("DSC") curve of heat flow versus temperature for Samples S1, S5-S8, and CS A, as prepared in Example 1.
Figure 3:
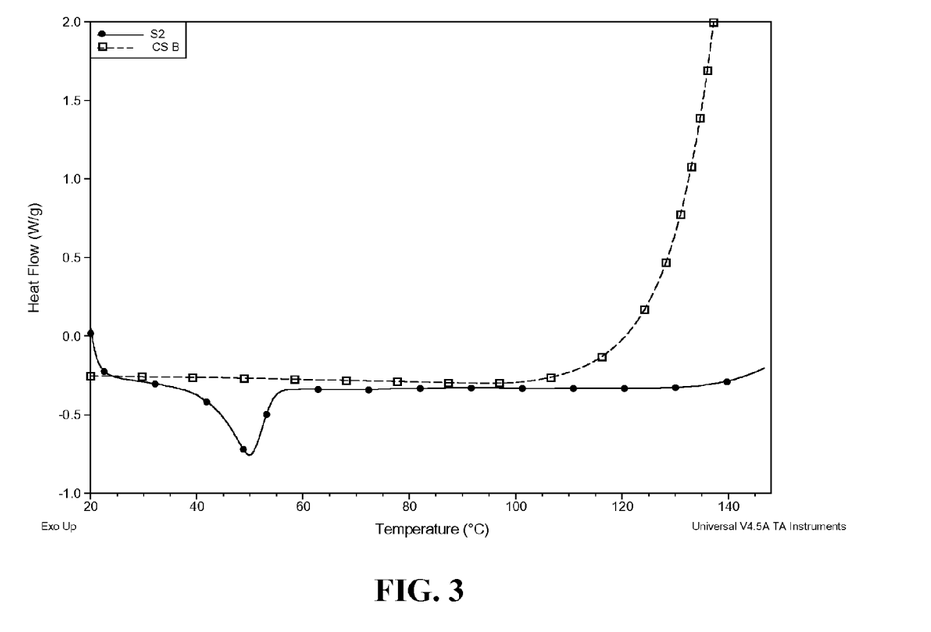
FIG. 3 is a DSC curve of heat flow versus temperature for Samples S2 and CS B, as prepared in Example 1.
Figure 4:
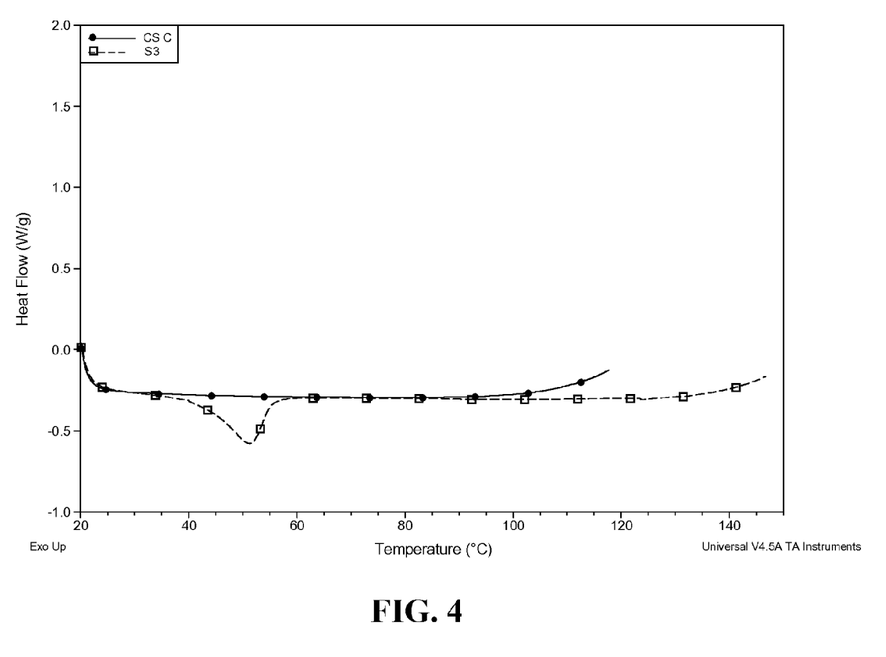
FIG. 4 is a DSC curve of heat flow versus temperature for Samples S3 and CS C, as prepared in Example 1.
Figure 5:
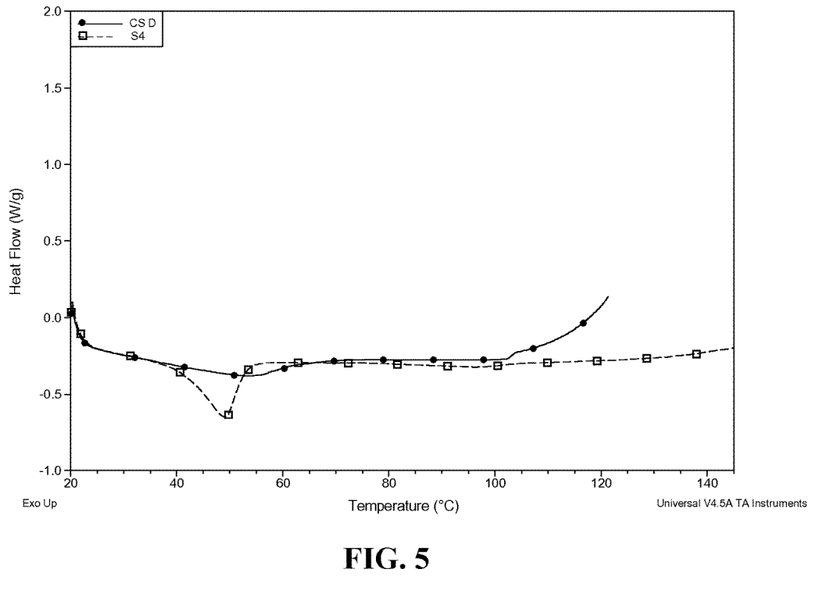
FIG. 5 is a DSC curve of heat flow versus temperature for Samples S4 and CS D, as prepared in Example 1.

The results of this analysis are provided in FIG. 1.

Regarding values for Scorch Improvement, a negative SI indicates a worsening anti-scorch property, where a positive SI indicates an improved anti-scorch property, with higher positive SI values being preferred for superior end-use performance.

Density

Determine density according to ASTM D792.

Melt Index

Measure melt index, or $I_2$, in accordance with ASTM D1238, condition 190° C./2.16 kg, and report in grams eluted per 10 minutes. Measure $I_{10}$ in accordance with ASTM D1238, condition 190° C./10 kg, and report in grams eluted per 10 minutes.

EXAMPLES

Example 1

Initial Heat Release Assessment

Prepare four comparative samples (CS A-CS D) by dissolving and mixing an organic peroxide and a cross-linking coagent using the procedure described in the first step of the "imbibing" process of the Test Methods section, above, according to the formulations provided in Table 2, below. Prepare eight samples (S1-S8) by dissolving and mixing an organic peroxide, a cross-linking coagent, and an antioxidant using the procedure described in the first step of the "imbibing" process of the Test Methods section, above, according to the formulations provided in Table 2, below. In this Example, the dicumyl peroxide ("DCP") is an organic peroxide available from Fang Rui Da, a Chinese vendor. The bis(alpha-t-butyl-peroxyisopropyl)benzene ("BIPB") is an organic peroxide available from Fang Rui Da, a Chinese vendor. The triallyl isocyanurate ("TAIC") is a cross-linking coagent available from Fang Rui Da, a Chinese vendor. The triallyl trimellitate ("TATM") is a cross-linking coagent available from Fang Rui Da, a Chinese vendor. Preblend A is a blend of antioxidants consisting of 61 wt % distearyl thiodipropionate ("DSTDP") (from Reagens), 38 wt % CYANOX™ 1790 (which is 1,3,5-tris(4-tert-butyl-3-hydroxy-2,6-dimethylbenzyl)-1,3,5-triazine-2,4,6-(1H,3H,5H) trione, available from Cytec Industries), and 1 wt % CYASORB™ UV 3346 (which is octadecyl-3,5-di-tert-butyl-4-hydroxyhydrocinnamate, available from Cytec Industries). IRGANOX™ 1010 is pentaerythritol tetrakis(3-(3,5-di-tert-butyl-4-hydroxyphenyl)propionate) and is available from Ciba Specialty Chemicals. The 4,4'-thiobis(6-tert-butyl-m-cresol) ("Lowinox TBM-6") is an antioxidant available from Chemtura. IRGANOX™ PS 802 is distearyl thiodipropionate, a heat stabilizer available from Ciba Specialty Chemicals. IRGANOX 245 is ethylene bis(oxyethylene)bis-(3-(5-tert-butyl-4-hydroxy-m-tolyl)-propionate), available from Ciba Specialty Chemicals. IRGANOX 1726 is 2,4-bis(dodecylthiomethyl)-6-methylphenol, available from Ciba Specialty Chemicals.

TABLE 2

Mixtures for Initial Heat Release Assessment

| | CS A | CS B | CS C | CS D | S1 | S2 | S3 | S4 | S5 | S6 | S7 | S8 |
|---|---|---|---|---|---|---|---|---|---|---|---|---|
| DCP (g) | 0.85 | 0.85 | 0.85 | — | 0.85 | 0.85 | 0.85 | — | 0.85 | 0.85 | 0.85 | 0.85 |
| BIPB (g) | — | — | — | 0.60 | — | — | — | 0.60 | — | — | — | — |
| TAIC (g) | 0.85 | — | — | 0.85 | 0.85 | — | — | 0.85 | 0.85 | 0.85 | 0.85 | 0.85 |
| TAC (g) | — | 0.85 | — | — | — | 0.85 | — | — | — | — | — | — |
| TATM (g) | — | — | 1.15 | — | — | — | 1.15 | — | — | — | — | — |
| Preblend A (g) | — | — | — | — | 0.36 | 0.36 | 0.36 | 0.36 | — | — | — | — |
| Irganox 1010 (g) | — | — | — | — | — | — | — | — | — | 0.11 | — | — |
| Irganox PS802 (g) | — | — | — | — | — | — | — | — | — | 0.12 | 0.22 | — |
| Lowinox TBM-6 (g) | — | — | — | — | — | — | — | — | 0.17 | 0.10 | — | — |
| Irganox 245 (g) | — | — | — | — | — | — | — | — | — | — | 0.18 | — |
| Irganox 1726 (g) | — | — | — | — | — | — | — | — | — | — | — | 0.20 |
| Initial Heat Release Temperature (° C.) | 116 | 115 | 117 | 114 | >150 | >150 | >150 | >150 | 142 | 144 | 142 | 141 |

Analyze each sample shown in Table 2 by DSC to determine their respective initial heat release temperatures as described in the Test Methods, above. As seen by the increased initial heat release temperature of Samples 1-8 in Table 2, above, the presence of antioxidant improves the Samples' stability dramatically, even using different coagents, peroxides, and antioxidant packages, when compared to CS A-D. The DSC plots of S1-8 and CS A-D are provided in FIGS. 2-5.

Example 2

Imbibing Effect on Scorch Improvement

Prepare 12 samples (S9-S20), each having 97.94 wt % DXM-446, 0.85 wt % DCP, 0.85 wt % TAIL, and 0.36 wt % Preblend A using the imbibing procedure described in the Test Methods section, above, and using the various time and temperature parameters shown in Table 3, below. Analyze each sample according to the Test Methods provided above. The results are shown in Table 3, below.

TABLE 3

S9-S20 Properties

| | S9 | S10 | S11 | S12 | S13 | S14 | S15 | S16 | S17 | S18 | S19 | S20 |
|---|---|---|---|---|---|---|---|---|---|---|---|---|
| Temperature (° C.) | 100 | 108 | 108 | 108 | 108 | 104 | 104 | 102 | 102 | 102 | 95 | 95 |
| Time (h) | 12 | 12 | 6 | 4 | 1 | 12 | 6 | 12 | 6 | 2 | 6 | 12 |
| ML (dN · m) | 0.19 | 0.18 | 0.19 | 0.19 | 0.20 | 0.19 | 0.19 | 0.18 | 0.19 | 0.20 | 0.20 | 0.19 |
| MH (dN · m) | 3.84 | 1.66 | 3.76 | 3.80 | 3.73 | 3.17 | 4.01 | 3.68 | 4.03 | 4.12 | 3.78 | 3.85 |
| MH − ML (dN · m) | 3.65 | 1.48 | 3.57 | 3.61 | 3.53 | 2.98 | 3.82 | 3.50 | 3.84 | 3.92 | 3.58 | 3.66 |
| ts1 @ 140° C. (min.) | 94 | >180 | 71 | 57 | 46 | >180 | 76 | 156 | 56 | 45 | 52 | 56 |
| ts0.5 @ 140° C. (min.) | 52 | >180 | 44 | 35 | 26 | 91 | 44 | 68 | 35 | 27 | 32 | 36 |
| Scorch Improvement | 56 | >74 | 32 | 18 | 6 | >132 | 40 | 116 | 20 | 11 | 13 | 18 |

Example 3

Imbibing Effect on Mechanical Properties and Cross-link Density

Prepare a comparative sample (CS E) using the compounding procedure described in the Test Methods section, above, according the formulation provided in Table 4, below.

TABLE 4

CS E Compositions

| | CS E |
|---|---|
| DXM-446 (wt %) | 97.94 |
| DCP (wt %) | 0.85 |
| TAIC (wt %) | 0.85 |
| Preblend A (wt %) | 0.36 |

Analyze CS E according to the Test Methods described above. The results are provided, along with a comparison to S16, in Table 5, below.

TABLE 5

CS E and S16 Properties

| | CS E | S16 |
|---|---|---|
| ML (dN · m) | 0.19 | 0.18 |
| MH (dN · m) | 3.97 | 3.68 |
| MH − ML (dN · m) | 3.78 | 3.50 |
| ts1 @140° C. (min.) | 60 | 156 |
| ts0.5 @140° C. (min.) | 38 | 68 |
| Scorch Improvement ("SI") (min.) | 22 | 116 |
| Tensile elongation ("TE") (%) | 490 | 508 |
| Tensile strength ("TS") (MPa) | 19 | 19 |
| TE after aging for 168 h at 136° C. (%) | 519 | 549 |
| TS after aging for 168 h at 136° C. (MPa) | 22 | 21 |
| TE Retention after heat aging (%) | 106 | 108 |
| TS Retention after heat aging (%) | 117 | 110 |

As shown in Table 5, the sample S16, prepared by imbibing at 102° C. and 12 hours, achieved a much higher scorch time without unduly sacrificing cross-link density (MH−ML), mechanical properties, and heat aging performance.

Example 4

Effect of Nitrogen Environment During Imbibing

Prepare an additional sample (S21) according to the imbibing procedure described in the Test Methods section, above, except charge nitrogen to the container prior to imbibing, then seal the container during imbibing. Imbibing is performed for 12 hours at a temperature of 102° C. Results are provided, along with a comparison to S16, below in Table 6.

TABLE 6

S16 and S21 Properties

| | S16 | S21 |
|---|---|---|
| ML (dN · m) | 0.18 | 0.20 |
| MH (dN · m) | 3.68 | 3.77 |
| MH − ML (dN · m) | 3.5 | 3.57 |
| ts1 @140° C. (min.) | 156 | 61 |
| ts0.5 @140° C. (min.) | 68 | 39 |

The results in Table 6 suggest that imbibing conducted under nitrogen provides less significant improvement on scorch. Though not wishing to be bound by theory, this suggests that the presence of oxygen during imbibing may be involved in the reaction to improve scorch.

Example 5

Comparison of Imbibing Versus Compounding Sample Preparations

Prepare 15 Samples (S22-S36) using the imbibing procedure described in the Test Methods section, above, according to the formulation provided in Table 7, below, using a temperature of 102° C. and a time period of 12 hours. Prepare 15 Comparative Samples (CS F-CS T) having the same respective compositions as S22-S36 but prepared via the above-described compounding procedure. The BIPB, DCP, TAIL, TATM, Preblend A, IRGANOX™ 1076, IRGANOX™ 1010, PS 802, and TBM-6 are the same as described in the preceding Examples. The triallyl cyanurate ("TAC") is a cross-linking coagent available from Fluka AG. The CYANOX™ 1790 is 1,3,5-tris(4-tert-butyl-3-hydroxy-2,6-dimethylbenzyl)-1,3,5-triazine-2,4,6-(1H,3H,5H)trione, available from Cytec Industries. The IRGANOX™ 1035 is benzenepropanoic acid, 3,5-bis(1,1-dimethylethyl)-4-hydroxy-thiodi-2,1-ethanediyl ester, available from Ciba Specialty Chemicals. IRGANOX™ 1726 is 2,4-bis(dodecylthiomethyl)-6-methylphenol, available from Ciba Specialty Chemicals. IRGANOX™ 1135 is octadecyl-3-(3,5-di-tert-butyl-4-hydroxyphenyl)-propionate, available from Ciba Specialty Chemicals. IRGANOX™ 1024 is 2',3-bis[[3-[3,5-di-tert-butyl-4-hydroxyphenyl]propionyl]]propionohydrazide, available from Ciba Specialty Chemicals. Analyze each of samples according to the Test Methods provided above. The results are provided in Table 8, below.

As can be seen from the results provided in Table 8, the SI of each sample prepared by the imbibing process in Table 7 is higher than those prepared by the compounding process. This suggests that a significant improvement on the balance between curing and scorch is achieved by employing the imbibing process.

Example 6

Comparison of Imbibing Versus Compounding Sample Preparations Without Co-agent

Prepare three sets of 11 Samples (S37-S46) using the imbibing procedure described in the Test Methods section, above, according to the formulation provided in Table 9, below, using a temperature of 102° C. and three different time periods of 6 hours and 9 hours respectively. Prepare 10 Comparative Samples (CS U-CS DD) having the same respective compositions as S37-S46 but prepared via the above-described compounding procedure. All components are the same as described above in the preceding Examples. Analyze each of the samples according to the Test Methods provided above. The results are provided in Table 10, below.

As can be seen from the results provided in Table 10, the SI of each sample prepared by the imbibing process in Table 9 is higher than those prepared by the compounding process. This suggests that a significant improvement on the balance between curing and scorch is achieved by employing the imbibing process, even in the absence of a cross-linking coagent.

TABLE 7

S22-S36 and CS F-CS T Compositions

|  | S22/ CS F | S23/ CS G | S24/ CS H | S25/ CS I | S26/ CS J | S27/ CS K | S28/ CS L | S29/ CS M |
|---|---|---|---|---|---|---|---|---|
| DXM-446 (wt %) | 97.94 | 97.64 | 98.19 | 97.90 | 97.97 | 97.94 | 98.13 | 98.10 |
| BIPB (wt %) | — | — | 0.60 | — | — | — | — | — |
| DCP (wt %) | 0.85 | 0.85 | — | 0.85 | 0.85 | 0.85 | 0.85 | 0.85 |
| TAIC (wt %) | 0.85 | — | 0.85 | 0.85 | 0.85 | 0.85 | 0.85 | 0.85 |
| TATM (wt %) | — | 1.15 | — | — | — | — | — | — |
| Preblend A (wt %) | 0.36 | 0.36 | 0.36 | — | — | — | — | — |
| Cyanox 1790 (wt %) | — | — | — | — | — | — | — | — |
| Irganox 1076 (wt %) | — | — | — | — | — | — | — | — |
| Irganox 1010 (wt %) | — | — | — | 0.18 | 0.11 | — | — | — |
| Irganox PS802 (wt %) | — | — | — | 0.22 | 0.12 | 0.18 | — | — |
| TBM-6 (wt %) | — | — | — | — | 0.10 | — | 0.17 | — |
| Irganox 1035 (wt %) | — | — | — | — | — | 0.18 | — | — |
| Irganox 1726 (wt %) | — | — | — | — | — | — | — | 0.20 |
| Irganox 1135 (wt %) | — | — | — | — | — | — | — | — |
| Irganox 1024 (wt %) | — | — | — | — | — | — | — | — |
| Irganox 245 (wt %) | — | — | — | — | — | — | — | — |
| Total | 100 | 100 | 100 | 100 | 100 | 100 | 100 | 100 |

|  | S30/ CS N | S31/ CS O | S32/ CS P | S33/ CS Q | S34/ CS R | S35/ CS S | S36/ CS T |
|---|---|---|---|---|---|---|---|
| DXM-446 (wt %) | 97.84 | 98.00 | 97.90 | 97.76 | 97.94 | 97.90 | 97.94 |
| BIPB (wt %) | — | — | — | — | — | — | — |
| DCP (wt %) | 0.85 | 0.85 | 0.85 | 0.85 | 0.85 | 0.85 | 0.85 |
| TAIC (wt %) | 0.85 | 0.85 | 0.85 | 0.85 | 0.85 | 0.85 | 0.85 |
| TATM (wt %) | — | — | — | — | — | — | — |
| Preblend A (wt %) | — | — | — | — | — | — | — |
| Cyanox 1790 (wt %) | — | — | — | — | 0.14 | — | 0.14 |
| Irganox 1076 (wt %) | — | — | 0.30 | 0.32 | — | — | — |
| Irganox 1010 (wt %) | — | — | — | — | — | — | — |
| Irganox PS802 (wt %) | 0.22 | 0.30 | — | 0.22 | 0.22 | 0.22 | 0.22 |
| TBM-6 (wt %) | — | — | — | — | — | — | — |
| Irganox 1035 (wt %) | — | — | — | — | — | — | — |
| Irganox 1726 (wt %) | — | — | — | — | — | — | — |
| Irganox 1135 (wt %) | 0.24 | — | — | — | — | — | — |
| Irganox 1024 (wt %) | — | — | 0.10 | — | — | — | — |
| Irganox 245 (wt %) | — | — | — | — | — | 0.18 | — |
| Total | 100 | 100 | 100 | 100 | 100 | 100 | 100 |

TABLE 8

S22-S36 and CS F-CS T Properties

|  | CS F | CS G | CS H | CS I | CS J | CS K | CS L | CS M | CS N | CS O | CS P | CS Q | CS R | CS S | CS T |
|---|---|---|---|---|---|---|---|---|---|---|---|---|---|---|---|
| ML(dN · m) | 0.20 | 0.19 | 0.18 | 0.22 | 0.20 | 0.22 | 0.19 | 0.22 | 0.22 | 0.23 | 0.22 | 0.22 | 0.20 | 0.20 | 0.20 |
| MH (dN · m) | 4.11 | 4.05 | 4.56 | 4.53 | 4.26 | 4.35 | 3.80 | 3.85 | 3.96 | 4.29 | 4.21 | 4.20 | 4.16 | 4.07 | 4.16 |
| MH − ML (dN · m) | 3.91 | 3.86 | 4.38 | 4.31 | 4.06 | 4.13 | 3.61 | 3.63 | 3.74 | 4.06 | 3.99 | 3.98 | 3.96 | 3.87 | 3.96 |
| ts1@180° C. (min.) | 1.22 | 1.20 | 1.76 | 0.88 | 1.33 | 0.90 | 1.63 | 1.16 | 1.05 | 0.98 | 0.92 | 0.99 | 1.16 | 1.20 | 1.16 |

TABLE 8-continued

S22-S36 and CS F-CS T Properties

| T90@180° C. (min.) | 4.47 | 4.15 | 8.16 | 3.69 | 4.60 | 3.77 | 5.11 | 4.24 | 3.96 | 3.97 | 4.04 | 4.04 | 4.21 | 4.11 | 4.21 |
|---|---|---|---|---|---|---|---|---|---|---|---|---|---|---|---|
| ts1@140° C. (min.) | 49 | 45 | 95 | 23 | 50 | 33 | 63 | 57 | 37 | 26 | 43 | 34 | 56 | 58 | 56 |
| ts0.5@140° C. (min.) | 30 | 30 | 60 | 14 | 33 | 20 | 45 | 31 | 22 | 14 | 26 | 20 | 36 | 37 | 36 |
| SI (min.) | 14 | 10 | 64 | −8 | 17 | −0.1 | 25 | 19 | 0.4 | −8 | 9 | −0.1 | 22 | 23 | 22 |

|  | S22 | S23 | S24 | S25 | S26 | S27 | S28 | S29 |
|---|---|---|---|---|---|---|---|---|
| ML (dN · m) | 0.20 | 0.20 | 0.20 | 0.23 | 0.20 | 0.22 | 0.19 | 0.21 |
| MH (dN · m) | 3.73 | 3.55 | 4.57 | 3.62 | 3.80 | 4.33 | 3.85 | 3.11 |
| MH − ML (dN · m) | 3.53 | 3.35 | 4.37 | 3.39 | 3.60 | 4.11 | 3.66 | 2.90 |
| ts1@180° C. (min.) | 1.36 | 1.31 | 1.78 | 1.07 | 1.37 | 1.00 | 1.60 | 1.36 |
| T90@180° C. (min.) | 4.76 | 4.28 | 8.23 | 3.88 | 4.55 | 3.84 | 4.98 | 4.31 |
| ts1@140° C. (min.) | 161 | 169 | 112 | 126 | 97 | 44 | 65 | 168 |
| ts0.5@140° C. (min.) | 67 | 62 | 64 | 52 | 52 | 29 | 47 | 64 |
| SI (min.) | 122 | 126 | 81 | 85 | 58 | 11 | 27 | 118 |
| Delta SI* (min.) | 108 | 117 | 17 | 93 | 41 | 11 | 2 | 99 |

|  | S30 | S31 | S32 | S33 | S34 | S35 | S36** |
|---|---|---|---|---|---|---|---|
| ML (dN · m) | 0.22 | 0.23 | 0.22 | 0.21 | 0.19 | 0.20 | 0.21 |
| MH (dN · m) | 3.97 | 3.97 | 3.83 | 3.78 | 2.41 | 2.8 | 3.24 |
| MH − ML (dN · m) | 3.75 | 3.74 | 3.61 | 3.57 | 2.22 | 2.60 | 3.03 |
| ts1@180° C. (min.) | 1.09 | 0.96 | 1.12 | 1.12 | 1.79 | 1.64 | 1.40 |
| T90@180° C. (min.) | 4.07 | 3.82 | 4.11 | 4.11 | 4.61 | 4.58 | 4.56 |
| ts1@140° C. (min.) | 106 | 100 | 64 | 113 | 180 | >180 | >180 |
| ts0.5@140° C. (min.) | 49 | 42 | 40 | 51 | 96 | 93 | 81 |
| SI (min.) | 69 | 63 | 25 | 74 | 112 | >123 | >132 |
| Delta SI* (min.) | 69 | 71 | 16 | 74 | 90 | >101 | >110 |

*Delta SI = difference between SI of sample and SI of comparative sample.
**Imbibing at 102° C. for 9 h.

TABLE 9

S37-S46 and CS U-CS DD Compositions

|  | S37/ CS U | S38/ CS V | S39/ CS W | S40/ CS X | S41/ CS Y | S42/ CS Z | S43/ CS AA | S44/ CS BB | S45/ CS CC | S46/ CS DD |
|---|---|---|---|---|---|---|---|---|---|---|
| DXM-446 (wt %) | 97.94 | 97.76 | 97.84 | 97.90 | 97.93 | 98.13 | 98.10 | 97.90 | 97.94 | 98.00 |
| DCP (wt %) | 1.7 | 1.7 | 1.7 | 1.7 | 1.7 | 1.7 | 1.7 | 1.7 | 1.7 | 1.7 |
| Cyanox 1790 (wt %) | 0.14 | — | — | — | — | — | — | — | — | — |
| Irganox 1076 (wt %) | — | 0.32 | — | — | — | — | — | — | — | — |
| Irganox 1010 (wt %) | — | — | — | — | 0.11 | — | — | 0.18 | — | — |
| Irganox PS802 (wt %) | 0.22 | 0.22 | 0.22 | 0.22 | 0.12 | — | — | 0.22 | 0.18 | 0.3 |
| TBM-6 (wt %) | — | — | — | — | 0.05 | 0.17 | — | — | — | — |
| Irganox 1035 (wt %) | — | — | — | — | 0.09 | — | — | — | 0.18 | — |
| Irganox 1726 (wt %) | — | — | — | — | — | — | 0.2 | — | — | — |
| Irganox 1135 (wt %) | — | — | 0.24 | — | — | — | — | — | — | — |
| Irganox 245 (wt %) | — | — | — | 0.18 | — | — | — | — | — | — |
| Total | 100 | 100 | 100 | 100 | 100 | 100 | 100 | 100 | 100 | 100 |

TABLE 10

S37-S46 and CS U-CS DD Properties

|  | CS U | CS V | CS W | CS X | CS Y | CS Z | CS AA | CS BB | CS CC | CS DD |
|---|---|---|---|---|---|---|---|---|---|---|
| ML (dN · m) | 0.22 | 0.22 | 0.22 | 0.21 | 0.22 | 0.21 | 0.23 | 0.23 | 0.23 | 0.23 |
| MH (dN · m) | 4.02 | 3.65 | 3.68 | 3.92 | 4.20 | 4.16 | 3.74 | 4.02 | 4.03 | 4.14 |
| MH − ML (dN · m) | 3.80 | 3.43 | 3.46 | 3.71 | 3.98 | 3.95 | 3.51 | 3.79 | 3.8 | 3.91 |
| ts1@180° C. (min.) | 1.17 | 1.26 | 1.26 | 1.23 | 1.16 | 1.238 | 1.377 | 1.132 | 1.163 | 1.16 |
| T90@180° C. (min.) | 4.34 | 4.63 | 4.67 | 4.42 | 4.42 | 4.637 | 4.502 | 4.353 | 4.358 | 4.702 |
| ts1@140° C. (min.) | 40.90 | 42.4 | 39.68 | 41.12 | 36.67 | 36.42 | 60.26 | 33.37 | 34.32 | 35.90 |

TABLE 10-continued

S37-S46 and CS U-CS DD Properties

| ts0.5@140° C. (min.) | 24.00 | 24.60 | 22.05 | 26.01 | 23.22 | 24.26 | 32.23 | 19.56 | 20.32 | 19.76 |
|---|---|---|---|---|---|---|---|---|---|---|
| SI (min.) | 5 | 1 | −1 | 4 | 2 | 2 | 20 | −3 | −2 | 1 |

| | | S37 | S38 | S39 | S40 | S41 | S42 | S43 | S44 | S45 | S46 |
|---|---|---|---|---|---|---|---|---|---|---|---|
| Imbibing at 102° C. For 6 hours | ML(dN · m) | 0.22 | 0.22 | 0.22 | 0.22 | 0.22 | 0.21 | 0.22 | 0.22 | 0.23 | 0.24 |
| | MH (dN · m) | 3.29 | 3.60 | 3.69 | 2.93 | 3.34 | 3.72 | 3.78 | 4.04 | 3.93 | 3.97 |
| | MH − ML (dN · m) | 3.07 | 3.38 | 3.47 | 2.71 | 3.12 | 3.51 | 3.56 | 3.82 | 3.7 | 3.73 |
| | ts1@180° C. (min.) | 1.43 | 1.25 | 1.26 | 1.56 | 1.40 | 1.28 | 1.30 | 1.15 | 0.84 | 1.17 |
| | T90@180° C. (min.) | 4.47 | 4.90 | 4.46 | 4.38 | 4.32 | 4.45 | 4.50 | 4.35 | 4.45 | 4.25 |
| | ts1@140° C. (min.) | 103 | 55 | 64 | >180 | 125 | 44 | 55 | 70 | 58 | 64 |
| | ts0.5@140° C. | 45 | 30 | 34 | 63 | 62 | 30 | 30 | 34 | 32 | 31 |
| | SI (min.) | 57 | 13 | 23 | >126 | 79 | 5 | 16 | 34 | 21 | 27 |
| Imbibing at 102° C. For 9 hours | ML(dN · m) | 0.21 | 0.23 | 0.23 | 0.22 | 0.21 | 0.21 | 0.23 | 0.23 | 0.23 | 0.23 |
| | MH (dN · m) | 1.48 | 3.58 | 3.46 | 1.64 | 1.13 | 3.59 | 3.5 | 3.48 | 3.78 | 3.22 |
| | MH − ML (dN · m) | 1.27 | 3.35 | 3.23 | 1.42 | 0.92 | 3.38 | 3.27 | 3.25 | 3.55 | 2.99 |
| | ts1@180° C. (min.) | n/a | 1.32 | 1.36 | 2.77 | n/a | 1.35 | 1.37 | 1.33 | 1.27 | 1.37 |
| | T90@180° C. (min.) | 3.14 | 4.54 | 4.38 | 4.23 | 3.68 | 4.40 | 4.33 | 4.19 | 4.29 | 4.07 |
| | ts1@140° C. (min.) | >180 | 72 | 105 | >180 | >180 | 49 | 68 | 69 | >180 | >180 |
| | ts0.5@140° C. | >180 | 36 | 43 | >180 | >180 | 33 | 35 | 24 | 51 | 69 |
| | SI (min.) | n/a | 30 | 60 | n/a | n/a | 7 | 24 | 25 | >140 | >132 |

Example 7

Effect of Nitrogen Environment During Imbibing Without Coagent

Prepare sample S47, having 97.94% DXM-446, 1.7% DCP and 0.36% antioxidant Preblend A, according to the imbibing procedure described in the Test Methods section, above, and the formulation in Table 10. Prepare sample S48 according to the imbibing procedure described in the Test Methods section, above, and the same formulation with S47, except charge nitrogen to the container prior to imbibing, then seal the container during imbibing. Imbibing is performed for 7.5 hours at a temperature of 102° C. Prepare a Comparative Sample (CS EE) having the same compositions as S47 but prepared via the above-described compounding procedure. Results are provided in Table 11.

TABLE 11

S47, S48 and CS EE Properties

| | S47 | S48 | CS EE |
|---|---|---|---|
| ML (dN · m) | 0.22 | 0.23 | 0.22 |
| MH (dN · m) | 3.91 | 3.92 | 4.06 |
| MH − ML (dN · m) | 3.69 | 3.69 | 3.84 |
| ts1 @180° C. | 1.25 | 1.17 | 1.16 |
| T90 @180° C. | 4.80 | 4.45 | 4.41 |
| ts1 @140° C. (min.) | 75 | 40 | 37 |
| ts0.5 @140° C. (min.) | 39 | 23 | 21 |
| SI | 37 | 2 | 1 |

The results in Table 11 suggest that imbibing conducted under nitrogen provides less significant improvement on scorch. Though not wishing to be bound by theory, this suggests that the presence of oxygen during imbibing may be involved in the reaction to improve scorch.

The invention claimed is:

1. A process for preparing a cross-linkable polymeric composition, said process comprising:
    combining an ethylene-based polymer with an organic peroxide and an antioxidant to thereby form said cross-linkable polymeric composition,
    wherein said combining step comprises imbibing at least a portion of said organic peroxide and at least a portion of said antioxidant into said ethylene-based polymer,
    wherein said combining step employs no compounding procedure;
    wherein said imbibing is effected by immersing or coating at least a portion of said ethylene-based polymer, as pellets, with said organic peroxide and said antioxidant for a time and temperature sufficient to effect such imbibing.

2. The process of claim 1, wherein said organic peroxide is selected from the group consisting of dicumyl peroxide; tert-butyl peroxybenzoate; di-tert-amyl peroxide; bis(alpha-t-butyl-peroxyisopropyl) benzene; isopropylcumyl t-butyl peroxide; t-butylcumylperoxide; di-t-butyl peroxide; 2,5-bis (t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; butyl 4,4-di(tert-butylperoxy)valerate; di(isopropylcumyl) peroxide; and mixtures of two or more thereof; wherein said antioxidant is a hindered phenol, a less hindered phenol, a thio compound, a siloxane, an amine, or mixtures of two or more thereof.

3. The process of claim 1, wherein said organic peroxide is dicumyl peroxide; wherein said antioxidant comprises one or more components selected from the group consisting of distearyl thiodipropionate, dilauryl thiodipropionate, octadecyl-3,5-di-t-butyl-4-hydroxyhydrocinnamate, benzenepropanoic acid,3,5-bis(1,1-dimethylethyl)-4-hydroxy-thiodi-2,1-ehtanediyl ester, stearyl 3-(3,5-di-t-butyl-4-hydroxyphenyl) propionate, octadecyl-3-(3,5-di-tert-butyl-4-hydroxyphenyl)-propionate, 2,4-bis(dodecylthiomethyl)-6-methylphenol, 4,4'-thiobis(6-tert-butyl-m-cresol), 4,6-bis (octylthiomethyl)-o-cresol, 1,3,5-tris(4-tert-butyl-3-hydroxy-2,6-dimethyl benzyl)- 1,3,5-triazine-2,4,6-(1H,3H, 5H)-trione, pentaerythritol tetrakis(3-(3,5-di-t-butyl-4-hydroxyphenyl)propionate), 2',3-bis[[3-[3,5-di-tert-butyl-4-hydroxyphenyl]propionyl]] propionohydrazide, and mixtures of two or more thereof; wherein said ethylene-based polymer is a low-density polyethylene ("LDPE").

4. The process of claim 1, further comprising pre-mixing said organic peroxide and said antioxidant to thereby form a mixture and thereafter at least partially immersing or coating said ethylene-based polymer in said mixture to effect said imbibing.

5. The process of claim 4, wherein said mixture has an initial heat release temperature of at least 120° C.

6. The process of claim 1, further comprising combining a cross-linking coagent with said ethylene-based polymer, said organic peroxide, and said antioxidant, wherein at least a portion of said cross-linking coagent is imbibed into said ethylene-based polymer.

7. The process of claim 6, wherein said ethylene-based polymer is present in said cross-linkable polymeric composition in an amount ranging from 50 to 99 weight percent, based on the entire weight of the cross-linkable polymeric composition; wherein said organic peroxide is present in said cross-linkable polymeric composition in an amount ranging from 0.1 to 5 weight percent, based on the entire weight of the cross-linkable polymeric composition; wherein said cross-linking coagent is present in said cross-linkable polymeric composition in an amount ranging from 0.1 to 3 weight percent, based on the entire weight of the cross-linkable polymeric composition; wherein said antioxidant is present in said cross-linkable polymeric composition in an amount ranging from 0.01 to 1 weight percent based on the entire weight of the cross-linkable polymeric composition.

8. A process comprising treating at least a portion of said cross-linkable polymeric composition according to claim 1 in a heated cure zone thereby forming a cross-linked polymeric composition, wherein said cross-linked polymeric composition has a cross-link density ("MH-ML") of at least 2.5 dN·m.

9. A process for producing a coated conductor, said process comprising:
   (a) premixing an organic peroxide and an antioxidant to thereby form an initial mixture;
   (b) at least partially immersing or coating an ethylene-based polymer, as pellets, in said initial mixture and allowing said ethylene-based polymer to at least partially imbibe said initial mixture to thereby form a cross-linkable polymeric composition comprising said ethylene-based polymer, at least a portion of said organic peroxide and at least a portion of said antioxidant;
   (c) coating a conductor with at least a portion of said cross-linkable polymeric composition; and
   (d) curing or allowing to cure at least a portion of said cross-linkable polymeric composition on said conductor, thereby forming said coated conductor wherein step (b) employs no compounding procedure.

10. The process of claim 9, wherein said organic peroxide is dicumyl peroxide; wherein said antioxidant comprises one or more components selected from the group consisting of distearyl thiodipropionate, dilauryl thiodipropionate, octadecyl-3,5-di-t-butyl-4-hydroxyhydrocinnamate, benzenepropanoic acid,3,5-bis(1,1-dimethylethyl)-4-hydroxy-thiodi-2,1-ehtanediyl ester, stearyl 3-(3,5-di-t-butyl-4-hydroxyphenyl) propionate, octadecyl-3-(3,5-di-tert-butyl-4-hydroxyphenyl)-propionate, 2,4-bis(dodecylthiomethyl)-6-methylphenol, 4,4'-thiobis(6-tert-butyl-m-cresol), 4,6-bis(octylthiomethyl)-o-cresol, 1,3,5-tris(4-tert-butyl-3-hydroxy-2,6-dimethyl benzyl)-1,3,5-triazine-2,4,6-(1H,3H,5H)-trione, pentaerythritol tetrakis(3-(3,5-di-t-butyl-4-hydroxyphenyl)propionate), 2', 3-bis[[3-[3,5-di-tert-butyl-4-hydroxyphenyl]propionyl]] propionohydrazide, and mixtures of two or more thereof; wherein said ethylene-based polymer is a low-density polyethylene ("LDPE"); wherein said imbibing of step (b) is performed at a temperature ranging from greater than the melting temperature of said initial mixture to less than the melting temperature of said ethylene-based polymer.

\* \* \* \* \*